United States Patent [19]

Mohr et al.

[11] 4,020,148

[45] Apr. 26, 1977

[54] PROCESS FOR DRYING SODIUM CARBONATE PEROXIDE

[75] Inventors: Richard A. Mohr, Martinsville; Sushil K. Bhalla, Princeton, both of N.J.; Peter H. Zeh, Williamsville, N.Y.

[73] Assignee: FMC Corporation, Philadelphia, Pa.

[22] Filed: July 15, 1975

[21] Appl. No.: 596,200

[52] U.S. Cl. .................................. 423/415 P; 34/26
[51] Int. Cl.² ........................................ C01B 15/10
[58] Field of Search ..................... 423/4.5 P; 34/36

[56] References Cited

UNITED STATES PATENTS

| 2,541,733 | 2/1951 | Young | 423/415 P |
| 3,860,694 | 1/1975 | Jayawant | 423/415 P |
| 3,917,663 | 11/1975 | Kegelart | 423/415 P |

FOREIGN PATENTS OR APPLICATIONS

| 1,195,641 | 6/1970 | United Kingdom | 423/415 P |

Primary Examiner—Earl C. Thomas
Assistant Examiner—Gary P. Straub
Attorney, Agent, or Firm—Gary M. Nath; Frank Ianno; Pauline Newman

[57] ABSTRACT

Manufacturing dry, free-flowing crystalline sodium carbonate peroxide by passing a gas stream at a temperature between 70° and 150° C into a drying zone containing moist sodium carbonate peroxide while maintaining the exit gas stream temperature between 50° and 130° C until the sodium carbonate contains between 0.05% and 0.5% by weight moisture, immediately passing the dried material into a cooling zone where the sodium carbonate peroxide temperature is lowered to between 0° and 40° C, and removing a dry, free-flowing, crystalline sodium carbonate peroxide product containing between 0.001% and 0.20% by weight moisture.

4 Claims, 1 Drawing Figure

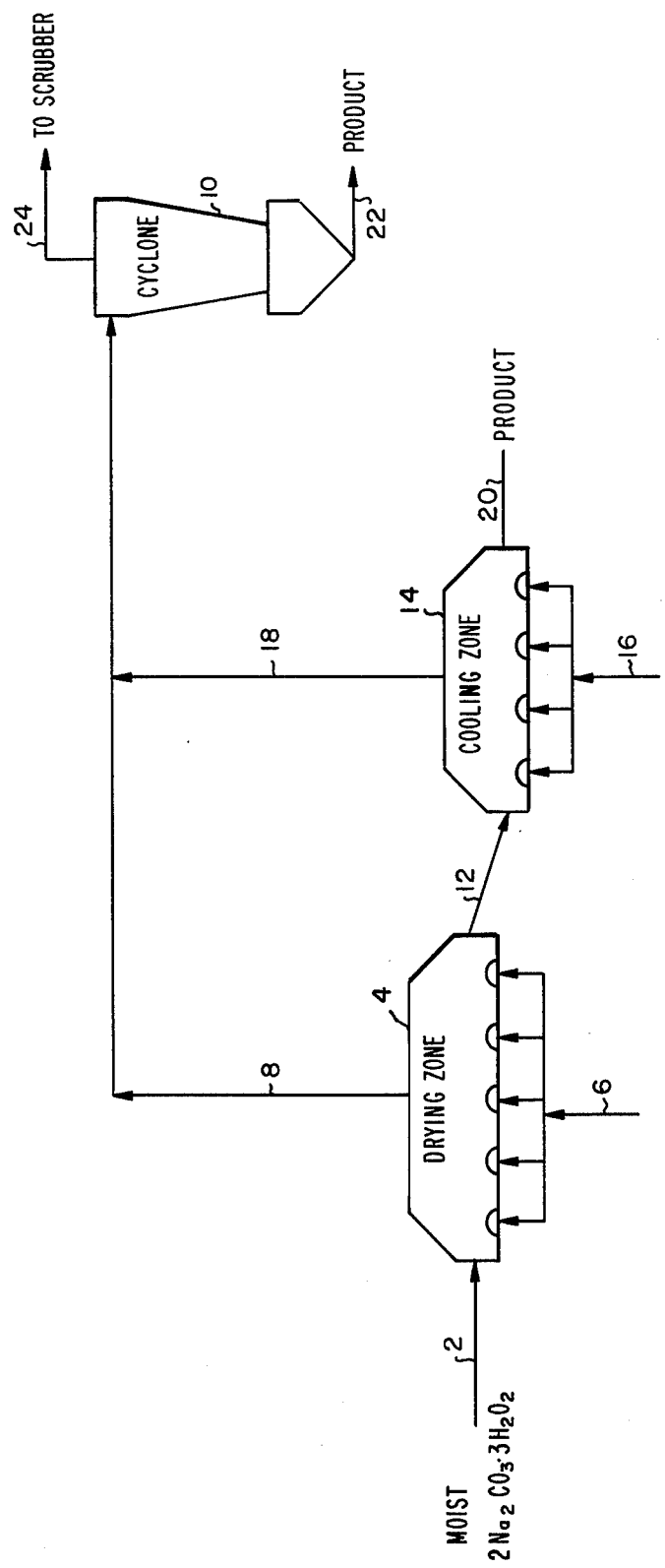

PROCESS FOR DRYING SODIUM CARBONATE PEROXIDE

This invention relates to an improved process for producing free-flowing, crystalline sodium carbonate peroxide, and more particularly, to a rapid method of drying this compound without loss of active oxygen.

Sodium carbonate peroxide is a crystalline compound having the formula $2Na_2CO_3.3H_2O_2$ and is obtained by reacting stoichiometric quantities of sodium carbonate and hydrogen peroxide. When placed in aqueous media, sodium carbonate peroxide breaks down into its component compounds, that is hydrogen peroxide and sodium carbonate. The salt thus acts as a carrier and source of hydrogen peroxide in a convenient dry form. Because of this property, sodium carbonate peroxide is useful as a bleaching agent in detergent formulations.

Sodium carbonate peroxide is conventionally prepared by reacting sodium carbonate and hydrogen peroxide in an essentially 2:3 molar ratio under controlled reaction conditions, as illustrated by the following equation:

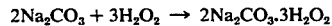

$$2Na_2CO_3 + 3H_2O_2 \rightarrow 2Na_2CO_3.3H_2O_2$$

The above reaction is preferably performed in a crystallization zone wherein a resultant slurry of sodium carbonate peroxide crystals is formed. The sodium carbonate peroxide crystals are separated from the slurry, and the crystals are dried to obtain a sodium carbonate peroxide product. Exemplary processes are described in U.S. Pat. Nos. 2,986,448 and 3,870,783.

It has been found most difficult to dry sodium carbonate peroxide in commercial quantities so that it contains negligible amounts of moisture without reducing the active oxygen content caused by hydrogen peroxide decomposition.

Some of the methods that have been employed to dry sodium carbonate peroxide, either singly or in combination, are:

a. vacuum drying at temperatures from 20° to 50° C,
b. warm air drying at temperatures from 40° to 60° C and
c. spray-drying of an aqueous slurry thereof.

In the vacuum drying technique, sodium carbonate peroxide crystals containing 2 to 30% by weight moisture are heated to a temperature from 20° to 50° under vacuum to accelerate drying. In the warm air drying technique, the sodium carbonate peroxide crystals are dried in an oven maintained at a temperature from 40° to 60° C with mild air circulation through the oven. Both of these processes are effective in removing the water to very low levels. However, these techniques are extremely slow, resulting in partial decomposition of sodium carbonate peroxide and accompanying lower active oxygen content.

In the spray drying technique, a liquid slurry of sodium carbonate peroxide is sprayed into a heated gas stream, and the water is flashed off leaving a dry residue. This method dries the sodium carbonate peroxide crystals rapidly but has certain drawbacks, such as the relatively large volumes of gases and high temperatures (about 150° to 250° C) necessary to remove the water by evaporation which results in some product decomposition and loss of active oxygen content. In addition, variations in either the slurry feed rate or the heated gas stream temperature or flow rate may result in a product having a variable moisture content and variable active oxygen content.

An improved process of manufacturing a dry, free-flowing crystalline sodium carbonate peroxide product has been discovered by reacting hydrogen peroxide and sodium carbonate in an aqueous medium, crystallizing and recovering the resulting moist sodium carbonate peroxide product, the improvement comprising:

a. passing the moist sodium carbonate peroxide into a drying zone, passing a heated gas stream at a temperature between 70° and 150° into said drying zone, maintaining the temperature of the exit gas from said drying zone at a reduced temperature between 50° and 130° C, maintaining the sodium carbonate peroxide within said drying zone in contact with said heated gas stream until the sodium carbonate peroxide contains between 0.05 and 0.5% by weight residual moisture;

b. passing the dried sodium carbonate peroxide into a cooling zone, passing a gas stream at a temperature between −20° nd 40° into said cooling zone, maintaining the temperature of the exit gas from said cooling zone at an increased temperature between 0° and 50° C; maintaining the sodium carbonate peroxide within said cooling zone in contact with said gas stream until the sodium carbonate peroxide is cooled to between 0° and 40° C and recovering the cooled material as a stable, dry, free-flowing, crystalline sodium carbonate peroxide product containing between 0.001% and 0.20% by weight residual moisture.

According to the process of this invention, sodium carbonate peroxide is separated from its mother liquor by conventional means, that is centrifuges or filters. The resulting moist product normally contains from about 2 to about 30% and preferably 2 to 10% by weight moisture. It is essential to remove the moist product from the centrifuge and pass it into the drying zone as quickly as possible to reduce loss of active oxygen content resulting from decomposition of the product into its component compounds.

Preferably, the moist product is fed by conveyor means into the drying zone which is made up of a chamber containing vibrating perforated or screen-type trays which support and convey the crystals through the drying section. Simultaneously, a heated gas inlet stream enters the chamber beneath the trays and passes through the openings in the trays to fluidize the crystals for efficient heat transfer. The heated gas stream, preferably heated air free of moisture, is passed through the drying zone at a flow rate of about 50 to about 150 preferably 100 feet per minute (30 meters/minute). The temperature of the inlet gases is adjusted so that the temperature of the exit gas leaving the drying zone is between 50° and 130° C and preferably between 50° and 80° C.

The exact temperature of the inlet gas required will depend upon the amount of moist product that is passed into the drying zone and the moisture content of the moist product. Inlet temperatures between 70° and 150° C and preferably between 75° and 130° C have been found suitable and result in the desired exit gas temperatures.

The moist product is contacted with the gas stream until the sodium carbonate peroxide contains between 0.05 and 0.5% by weight residual moisture and preferably between 0.10 and 0.25% by weight residual moisture. This moisture level is achieved with little product loss and with virtually no loss of active oxygen during the drying step. This is most important since the loss of even a few percent of active oxygen during the drying stage may render the product unacceptable for commercial marketing. Contacting time will vary between 5 and 60 minutes in order to permit uniform drying regardless of particle size distribution.

The exit gas stream from the drying zone containing finely divided, suspended particles of sodium carbonate peroxide is fed to a recovery system for removing the particles from the exit gas stream. Typical recovery systems can be carried out by passing the exit gas stream into a cyclone separator or a dust collector to remove the bulk of the solids. The effluent gas stream from a dust collector is preferably exhausted to the atmosphere, while the effluent gas stream from a cyclone is preferably fed to a conventional water scrubber for removal of trace amounts of solids before the air is exhausted into the atmosphere. The product streams from the cyclone separator or dust collector are in a finely divided state and are mainly −80+200 mesh (U.S. Standard Sieve). This product stream can either be recovered as saleable sodium carbonate peroxide values or recycled to the crystallization zone as a source of seed crystals.

The sodium carbonate peroxide product leaving the drying zone has a temperature between 70° and 140° C and accordingly must be passed into a cooling zone as quickly as possible to avoid product decomposition losses. Preferably, the dried product is fed directly into a cooling zone, which is identical to the drying zone except that the inlet air is not heated. The gas stream is passed into the cooling zone at atmospheric pressure having a temperature between −20° and 40° C and preferably 10° to 30° C at a flow rate of about 50 to about 150 and preferably about 100 feet per minute. The temperature of the exit gas leaving the cooling zone is maintained between 0° and 50° C. The sodium carbonate peroxide product is contacted with the gas stream until the product is cooled to a temperature between 0° and 40° C. Higher product temperatures tend to cause localized decomposition generating heat and moisture which results in product decomposition.

After cooling has been completed, the resultant product is a free-flowing, crystalline material containing between 0.001% and 0.2% by weight residual moisture. Virtually no loss of active oxygen content is noted.

The exit gas stream from the cooling zone containing finely divided, suspended particles of sodium carbonate peroxide is fed to a recovery system such as hereinabove described to recover the bulk of the solids. Preferably the drying zone and cooling zone exit gas streams are combined and treated simultaneously.

The drawing shows a flow sheet of one embodiment of the process of the invention.

In the drawing, a moist sodium carbonate peroxide product separated from mother liquor is fed into drying zone 4 through line 2. Drying zone 4 may be a conventional dryer such as a vibrating fluidized bed dryer. Simultaneously, a heated gas stream is passed into drying zone 4 through conduits 6. The heated gas stream dries the moist product resulting in a sodium carbonate peroxide material containing between 0.05 and 0.5% by weight residual moisture. The exit gas stream is removed through line 8 and fed into cyclone separator 10 for recovery of suspended particles. The dried solids are withdrawn from drying zone 4 through line 12 and passed into cooling zone 14. Simultaneously, a cooled gas stream is passed into cooling zone 14 through conduits 16. The cooled gas stream removes the remaining traces of moisture from the sodium carbonate peroxide product and lowers the temperature of the product to between 0° and 40° C. The resulting material withdrawn through line 20 is a dry free-flowing, crystalline sodium carbonate peroxide product containing between 0.001% and 0.2% by weight residual moisture.

The exit gas stream is removed from cooling zone 14 through line 18 and preferably combined with exit gas present in line 8 and passed into cyclone separator 10. The bulk of the solids present in exit gas streams 8 and 18 are separated in cyclone separator 10 and removed through line 22. Exhaust gas leaves cyclone separator 10 through line 24 which is fed to a conventional scrubber for removal of trace amounts of solids before the air is exhausted into the atmosphere.

The following example is given to illustrate the invention taken together with the flow diagram in the accompanying drawing. All percentages given are based upon weight unless otherwise indicated.

EXAMPLE

Sodium carbonate peroxide crystals containing 5% water, assaying about 15.22% active oxygen content, was continuously fed into a fluidized bed vibrating conveyor type drier at a rate of 965 kilograms/hour. Simultaneously, a dry air stream was passed into the dryer at a rate of 100 feet/minute. The inlet temperature of the gas stream was 80° C and the outlet temperature was maintained at 55° C. The sodium carbonate peroxide crystals were maintained in the dryer for about 30 minutes whereupon the resultant material, having a temperature of about 75° C and containing 0.2% by weight moisture was immediately introduced into a cooling zone. The inlet temperature of the cooling zone gas stream was 5° C and the outlet temperature was maintained at 25° C. The gas stream was passed into the cooling zone at a rate of 100 feet/minute. The sodium carbonate peroxide crystals were maintained in the cooling zone for about 7 minutes whereupon the resultant material, having a temperature of 20° C and containing less than 0.2% by weight moisture was removed and passed to storage. The exit gas streams from the drying zone and cooling zone were passed through a cyclone for recovery of dried sodium carbonate peroxide particles measuring 33% −50+80; 21% −80+100; 29% −100+140 and 17% −140 mesh (U.S. Standard Sieve).

The dried sodium carbonate peroxide product was free-flowing and crystalline, and had an active oxygen content of 15.18% by weight. The theoretical active oxygen content of sodium carbonate peroxide is 15.28% by weight.

The invention being thus described, it will be obvious that the same may be varied in many ways. Such variations are not to be regarded as a departure from the spirit and scope of the invention and all such modifications are intended to be included within the scope of the following claims.

What is claimed is:

1. In a process of manufacturing a dry, free-flowing, crystalline sodium carbonate peroxide product by reacting hydrogen peroxide and sodium carbonate in an aqueous medium, crystallizing, recovering and drying the resulting moist sodium carbonate peroxide product, the improvement in reducing the loss of active oxygen during drying which comprises:

a. passing the moist sodium carbonate peroxide into a drying zone, passing a heated gas stream at a temperature between 70° and 150° C into said drying zone, maintaining the temperature of the exit gas from said drying zone at a reduced temperature between 50° and 130° C, maintaining the sodium carbonate peroxide within said drying zone in contact with said heated gas stream until the sodium carbonate peroxide contains between 0.05 and 0.5% by weight residual moisture;

b. rapidly cooling the hot sodium carbonate peroxide by passing the dried sodium carbonate peroxide into a cooling zone, passing a gas stream at a temperature between −20° and 40° C into said cooling zone, maintaining the temperature of the exit gas from said cooling zone at an increased temperature between 0° and 50° C; maintaining the sodium carbonate peroxide within said cooling zone in contact with said gas stream until the sodium carbonate peroxide is cooled to between 0° and 40° C, and the sodium carbonate peroxide has a lowered residual moisture content, and recovering the cooled material as a stable, dry, free-flowing, crystalline sodium carbonate peroxide product containing between 0.001% and 0.20% by weight residual moisture.

2. The process of claim 1 which comprises removing particles of dry sodium carbonate peroxide from said drying zone and cooling zone exit gases.

3. The process of claim 1, wherein the temperature of the gas stream passing into the drying zone is between 75° and 130° C and the exit gas temperature is maintained between 50° and 80° C.

4. The process of claim 1 wherein the sodium carbonate peroxide is maintained in the drying zone until it contains between 0.10% and 0.25% by weight residual moisture.

* * * * *